(12) United States Patent
Lee et al.

(10) Patent No.: US 10,318,222 B2
(45) Date of Patent: Jun. 11, 2019

(54) APPARATUS AND METHOD FOR SCREEN DISPLAY CONTROL IN ELECTRONIC DEVICE

(71) Applicant: Samsung Electronics Co., Ltd., Gyeonggi-do (KR)

(72) Inventors: Sukjae Lee, Seoul (KR); Yongchae Jung, Seoul (KR); Bokeun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 376 days.

(21) Appl. No.: 14/944,956

(22) Filed: Nov. 18, 2015

(65) Prior Publication Data
US 2016/0139866 A1 May 19, 2016

(30) Foreign Application Priority Data
Nov. 18, 2014 (KR) .................. 10-2014-0161107

(51) Int. Cl.
*G06F 3/0482* (2013.01)
*G06F 3/14* (2006.01)
(Continued)

(52) U.S. Cl.
CPC .............. *G06F 3/14* (2013.01); *G06F 3/0481* (2013.01); *G06F 3/0482* (2013.01);
(Continued)

(58) Field of Classification Search
CPC .................................................. G06F 3/04842
(Continued)

(56) References Cited

U.S. PATENT DOCUMENTS 8,165,886 B1 * 4/2012 Gagnon .................. G10L 15/19
704/275
8,947,376 B2 * 2/2015 Sirpal .................... G06F 1/1616
345/173
(Continued)

FOREIGN PATENT DOCUMENTS

DE 10 2013 002 891 9/2014
EP 2 680 123 1/2014
(Continued)

OTHER PUBLICATIONS

European Search Report dated May 3, 2016 issued in counterpart application No. 15195011.0-1972, 8 pages.

*Primary Examiner* — Daniel Rodriguez
(74) *Attorney, Agent, or Firm* — The Farrell Law Firm, P.C.

(57) ABSTRACT

An apparatus and method are provided for controlling the display of a screen in an electronic device that supports multitasking. In the method, the apparatus displays first and second application execution screens on first and second areas of a screen, respectively. The first and second areas are distinct from each other. When an event for executing a third application is detected, the apparatus displays the second application execution screen on the first area and also displays a third application execution screen on the second area in response to the detected event. When execution of the third application is terminated, the apparatus displays the first application execution screen on the first area and also displays the second application execution screen on the second area.

16 Claims, 10 Drawing Sheets

(51) Int. Cl.
*G06F 3/0484* (2013.01)
*G06F 3/0481* (2013.01)
*G06F 9/451* (2018.01)

(52) U.S. Cl.
CPC .......... *G06F 3/04842* (2013.01); *G06F 9/451* (2018.02); *G06F 2203/04803* (2013.01)

(58) Field of Classification Search
USPC ........................................................ 715/802
See application file for complete search history.

(56) References Cited

U.S. PATENT DOCUMENTS

| | | | | |
|---|---|---|---|---|
| 9,128,544 | B2* | 9/2015 | Chun | G06F 3/041 |
| 9,229,474 | B2* | 1/2016 | Gimpl | G06F 1/1616 |
| 9,424,111 | B2* | 8/2016 | Beilis | G06F 3/0481 |
| 9,588,545 | B2* | 3/2017 | Sirpal | G06F 1/1616 |
| 9,733,815 | B2* | 8/2017 | Xia | G06F 3/0481 |
| 2006/0205518 | A1* | 9/2006 | Malabuyo | A63F 13/10 |
| | | | | 463/43 |
| 2008/0297483 | A1* | 12/2008 | Kim | G06F 3/04817 |
| | | | | 345/173 |
| 2009/0132960 | A1 | 5/2009 | Park | |
| 2010/0114714 | A1* | 5/2010 | Vitek | G06Q 30/00 |
| | | | | 705/14.69 |
| 2011/0004845 | A1* | 1/2011 | Ciabarra | G06F 3/0481 |
| | | | | 715/808 |
| 2011/0103770 | A1* | 5/2011 | Goodman | H04N 7/141 |
| | | | | 386/255 |
| 2011/0167383 | A1* | 7/2011 | Schuller | G06F 9/451 |
| | | | | 715/808 |
| 2011/0265040 | A1* | 10/2011 | Shin | G06F 3/0485 |
| | | | | 715/830 |
| 2012/0001829 | A1* | 1/2012 | Anttila | G06F 3/1431 |
| | | | | 345/1.1 |
| 2012/0081313 | A1* | 4/2012 | Sirpal | G06F 1/1616 |
| | | | | 345/173 |
| 2012/0218192 | A1* | 8/2012 | Lazaridis | G06F 1/1626 |
| | | | | 345/173 |
| 2013/0042192 | A1* | 2/2013 | Liao | H04M 1/72519 |
| | | | | 715/768 |
| 2013/0055160 | A1* | 2/2013 | Yamada | G06F 3/017 |
| | | | | 715/810 |
| 2013/0120294 | A1* | 5/2013 | Sun | G06F 3/041 |
| | | | | 345/173 |
| 2014/0007123 | A1 | 1/2014 | Yuan | |
| 2014/0085188 | A1 | 3/2014 | Kim et al. | |
| 2014/0157163 | A1* | 6/2014 | Strutin-Belinoff | G06F 3/04883 |
| | | | | 715/769 |
| 2014/0229888 | A1* | 8/2014 | Ko | G06F 3/04886 |
| | | | | 715/783 |
| 2014/0282214 | A1* | 9/2014 | Shirzadi | G06F 3/04883 |
| | | | | 715/781 |
| 2015/0143238 | A1* | 5/2015 | Jung | G06F 3/04817 |
| | | | | 715/708 |
| 2015/0172249 | A1* | 6/2015 | Schneider | H04L 51/24 |
| | | | | 715/752 |
| 2015/0186009 | A1* | 7/2015 | Nishimura | G06F 9/445 |
| | | | | 715/804 |
| 2015/0227287 | A1* | 8/2015 | Lee | G06F 3/04883 |
| | | | | 715/830 |
| 2016/0034284 | A1* | 2/2016 | Won | G06F 9/44505 |
| | | | | 713/100 |
| 2016/0046188 | A1* | 2/2016 | Wild | B60K 35/00 |
| | | | | 701/36 |
| 2016/0103648 | A1* | 4/2016 | Reeves | G06F 1/1616 |
| | | | | 345/173 |
| 2016/0239174 | A1* | 8/2016 | Jeong | G06F 3/14 |
| 2016/0239203 | A1* | 8/2016 | Sato | G06F 3/1423 |
| 2017/0131894 | A1* | 5/2017 | de Moraes | G06F 3/0488 |

FOREIGN PATENT DOCUMENTS

| | | |
|---|---|---|
| EP | 2 712 157 | 3/2014 |
| EP | 2 767 896 | 8/2014 |

\* cited by examiner

APPARATUS AND METHOD FOR SCREEN DISPLAY CONTROL IN ELECTRONIC DEVICE

PRIORITY

This application claims priority under 35 U.S.C. § 119(a) to a Korean Patent Application filed in the Korean Intellectual Property Office on Nov. 18, 2014 and assigned Serial No. 10-2014-0161107, the entire disclosure of which is incorporated herein by reference.

BACKGROUND

1) Field of the Disclosure

The present disclosure relates to an apparatus and method for controlling a display of a screen in an environment that supports multitasking.

2) Description of the Related Art

Due to the growth of various technologies, a variety of electronic devices have become increasingly popular these days while their functionality has expanded for the user. For example, a smart phone now performs various functions, such as gaming, multimedia, camera, Internet access, scheduling, messaging, navigation, and the like, as well as voice call functionality. Normally, a smart phone may have a touch screen. Using this touch screen, a smart phone detects a user input and visually displays a screen in response to the user input.

In order to meet users' diversified demands, a multitasking function for simultaneously operating a plurality of applications is frequently used. An electronic device that supports a multitasking function may display running applications on a single screen. When two or more applications are executed in a multitasking environment, an electronic device may display respective application execution screens on a split screen. For example, one application execution screen may be displayed on an upper part of the split screen, and the other may be displayed on a lower part of the split screen.

When a user who has a large-sized electronic device holds the electronic device with one hand, the user may often have difficulty in manipulating an application displayed on the upper part of the split screen by using his or her thumb only. Certain applications displayed out of reach from the thumb may be not easy to manipulate. Further, when any event for executing a new application occurs, the use of running applications may be limited.

SUMMARY

Accordingly, an aspect of the present disclosure provides an apparatus and method for controlling a screen display so that an application execution screen displayed on a relatively distant first area can be displayed on a relatively near second area when it is required to manipulate the application execution screen on the first area.

According to an aspect of the present disclosure, an apparatus and method for controlling a screen display so that an item for controlling an application execution screen displayed on the first area can be displayed on the second area which allows one-handed manipulation of the user interface.

According to an aspect of the present disclosure, an apparatus for controlling a screen display in an electronic device includes a display panel configured to display respective application execution screens on first and second areas of a screen wherein the first and second areas are distinct from each other; and a control unit configured to control the display panel to display a second application execution screen on the first area and to display a third application execution screen on the second area when an event for executing a third application is detected while a first application execution screen is displayed on the first area and the second application execution screen is displayed on the second area, and configured to control the display panel to display the first application execution screen on the first area and to display the second application execution screen on the second area when execution of the third application is terminated.

According to an aspect of the present disclosure, a method for controlling a screen display in an electronic device includes operations of displaying first and second application execution screens on first and second areas of a screen, respectively, wherein the first and second areas are distinct from each other; detecting an event for executing a third application; displaying the second application execution screen on the first area and also displaying a third application execution screen on the second area in response to the detected event; and displaying the first application execution screen on the first area and also displaying the second application execution screen on the second area when execution of the third application is terminated.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Figure 1:
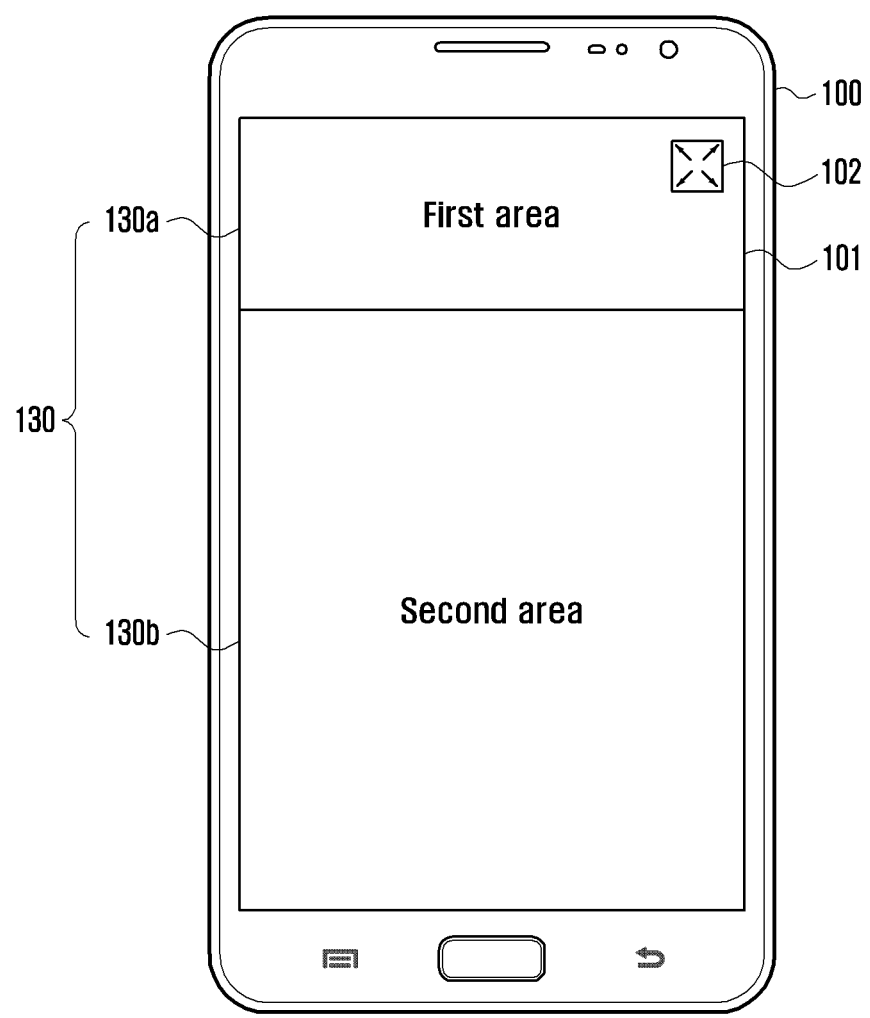
FIG. 1 is a diagram illustrating a split screen of an electronic device according to an embodiment of the present disclosure.

Hereinafter, various embodiments will be described with reference to the accompanying drawings. This disclosure may be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present disclosure. Although the drawings represent particular embodiments, the drawings are not necessarily to scale and certain features may be exaggerated or omitted in order to better illustrate and explain the present disclosure. Throughout the drawings, the same or similar reference numerals denote corresponding features consistently.

Unless defined differently, all terms used herein, which include technical terminologies or scientific terminologies, have the same meaning as that understood by a person skilled in the art to which the present invention belongs. Singular forms are intended to include plural forms unless the context clearly indicates otherwise.

The terms such as "comprise", "include", and/or "have" may be construed to denote a certain characteristic, number, step, operation, constituent element, component or a combination thereof, but are not to be construed to exclude the existence of or a possibility of addition of one or more other characteristics, numbers, steps, operations, constituent elements, components or combinations thereof. The expression "or" includes any and all combinations of the associated listed words. For example, the expression "A or B" may include A, may include B, or may include both A and B.

In various embodiments disclosed herein, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them, the first user device and the second user device, are user devices. For example, a first element may be referred to as a second element, and similarly, a second element may be also referred to as a first element without departing from the scope of the present disclosure.

FIG. 1 is a diagram illustrating a split screen of an electronic device according to an embodiment of the present disclosure.

Referring to FIG. 1, the electronic device 100 that supports a multitasking environment may logically divide the entire area of a touch screen 130 into two or more areas. For example, the electronic device 100 may divide the area of the touch screen 130 lengthwise or widthwise, and the dividing of the screen may be adjusted when the orientation of the electronic device 100 is rotated 90°.

In an embodiment of the present disclosure, the electronic device 100 may display the first application execution screen on the first area 130a located at an upper part of the logically divided screen 130, and also display the second application execution screen on the second area 130b located at a lower part of the logically divided screen 130. Of course, the reverse is also possible.

In another embodiment of the present disclosure, the electronic device 100 may display the first application execution screen on the first area located at a left part of the logically divided screen 130, and also display the second application execution screen on the second area located at a right part of the logically divided screen 130. Of course, in this case as well, the reverse is also possible.

Hereinafter, it will be defined that 'the first area' refers to a region located at the upper part of the logically divided screen and also 'the second area' refers to a region located at the lower part of the logically divided screen. The first and second areas are distinct from each other, and the dimensions thereof are not fixed. This definition is an example only and not to be considered as a limitation of the present disclosure. For example, although the second area 130b is shown as being greater than the first area 130a, this is merely an example. Alternatively, the second area 130b may be smaller than or of the same size as the first area 130a.

An application displayed on the first area 130a may be one of a specific application selected by a user, a predefined default application (e.g., defined at manufacture), a recently executed application, or a frequently executed application, and may be displayed in the form of a widget, a shortcut, an icon, or the like. If multiple applications are displayed on the first area 130a, each individual application execution screen may be displayed one by one in response to a user input (e.g., a drag) in a widthwise or lengthwise direction. The same may be applied to the second area 130b.

The first and second areas 130a and 130b may be formed by different touch screens which are physically distinct from each other. Namely, two touch screens may be logically unified and respectively form the first and second areas 130a and 130b. Although embodiments disclosed herein employ a split screen in which a physically single touch screen is logically divided into two screen areas, this is merely a particular embodiment and is not to be considered a limitation.

The electronic device 100 may activate or deactivate a screen split function for displaying respective application execution screens on logically divided areas of the screen in a multitasking environment. In response to a user's request, the electronic device 100 may turn on or off the screen split function.

In an embodiment of the present disclosure, if the screen split function is activated, the electronic device 100 may display the first application execution screen on the first area and also display the second application execution screen on the second area. Subsequently, if an event for executing the third application occurs, the electronic device 100 may display the second application execution screen on the first area and also display the third application execution screen on the second area. In this case, the attribute of the third application may be set to display an application execution screen on the second area. This attribute of the third application may be set by a user. Additionally or alternatively, such an attribute may be set by a developer during the development of an application or by a manufacturer during the manufacture of the electronic device.

In an embodiment of the present disclosure, the attribute of the third application may be set differently according to application types by, e.g., a user. For example, the attribute of a call application may be set to display a call application execution screen on the second area. Also, the attribute of a music application may be set to display at least one item for controlling the music application on the second area. In such cases, if an event for executing the third application occurs, the electronic device may determine whether to display the third application execution screen on the second area or to display the control item for the third application on the second area, depending on application types, i.e., based on the attribute of the third application.

In another embodiment of the present disclosure, the attribute of the third application may be set equally regardless of application types by, e.g., a user. For example, all attributes of a call application and a music application may be set to display a corresponding application execution screen on the second area or to display at least one item for controlling a corresponding application on the second area.

The electronic device 100 may display application execution screens on the first and second areas 130a and 130b at the same layer.

In another embodiment of the present disclosure, if the screen split function is activated, the electronic device 100 may display the first application execution screen on the first area and also display the second application execution screen on the second area. Then, if an event for executing the third application occurs, the electronic device 100 may display the third application execution screen on the first area while maintaining a display of the second application execution screen on the second area. Further, the electronic device 100 may display at least one item for controlling the third application on the second area. In this case, the attribute of the third application may be set to display a control item on the second area. The at least one item for controlling the third application may be displayed, for example, in the form of a button at an upper layer on a currently displayed application execution screen.

In case different application execution screens are displayed respectively on the first and second areas 130a and 130b of the touch screen 130, the electronic device 100 may control each individual application to be executed independently. In response to a user input on each of the first and second areas 130a and 130b, the electronic device 100 may display a corresponding application execution screen on a corresponding area. In some cases, applications executed on the first and second areas 130a and 130b may be controlled in conjunction with each other.

In an embodiment of the present disclosure, a message application may be executed on the first area 130a, and a gallery application may be executed on the second area 130b. In this case, the electronic device 100 may support a function to attach a photo arranged in a gallery application execution screen to a message displayed in a message application execution screen.

In another embodiment of the present disclosure, while different application execution screens are displayed on the first and second areas 130a and 130b, the electronic device 100 may receive a user input for maximizing an application execution screen displayed on the first or second screen 130a or 130b. For example, the first area 130a may contain a maximization button 102 displayed thereon, and a user may select this button 102 to maximize the application execution screen displayed on the first screen 130a. In response to this input, the electronic device 100 may display this application execution screen on a full screen 101.

If the screen split function is deactivated, the electronic device 100 may display a selected application execution screen on the full screen 101 of the touch screen 130.

Figure 2:
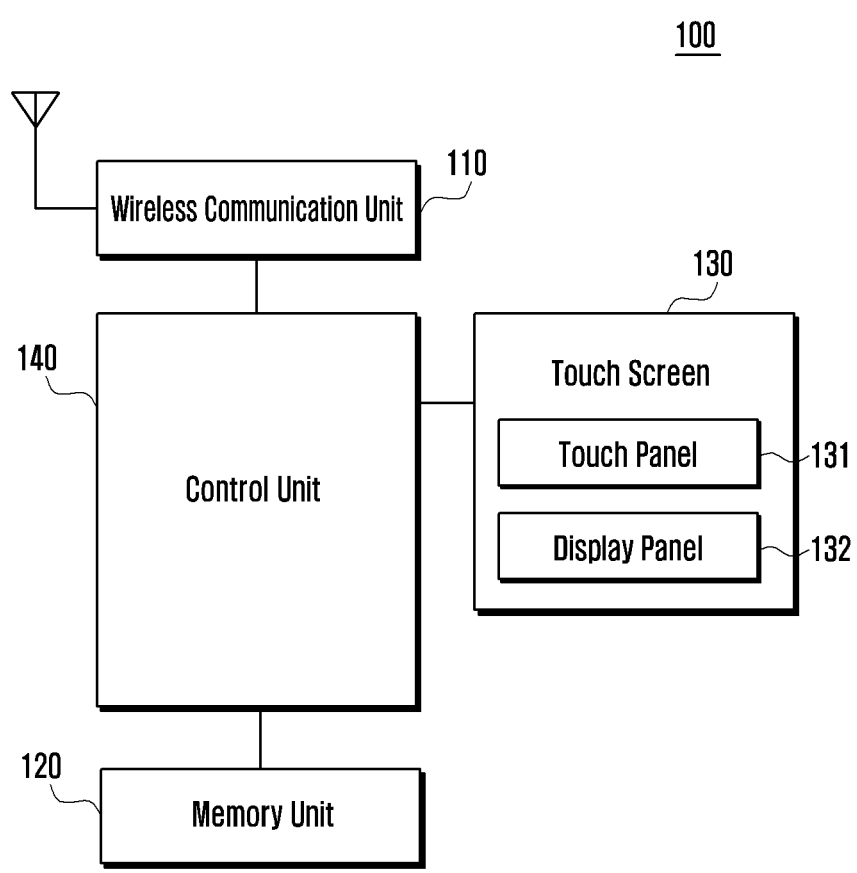
FIG. 2 is a block diagram illustrating major elements of an electronic device according to an embodiment of the present disclosure.

FIG. 2 is a block diagram illustrating major elements of an electronic device according to an embodiment of the present disclosure.

Referring to FIG. 2, the electronic device 100 may include a wireless communication unit 110, a memory unit 120, a touch screen 130, and a control unit 140.

The wireless communication unit 110 may include one or more modules for performing wireless communication between the electronic device 100 and a wireless communication system or network having other electronic devices. For example, the wireless communication unit 110 may include a mobile communication module, a wireless local area network (WLAN) module, various types of short range communication modules, a location computation module, a broadcast receiving module, and the like.

The wireless communication unit 110 may receive an incoming call or message while respective applications are executed on the first and second areas. In an embodiment of the present disclosure, the reception of a call or message may be considered an event for executing the third application.

The memory unit 120 may store programs and applications required for the electronic device 100 or selected by a user. Further, the memory unit 120 may store various types of data created during the operation of the electronic device 100 or received from any external entity through the wireless communication unit 110.

In an embodiment of the present disclosure, the memory unit 120 may store setting information about whether to use a screen split function, information about applications to be disposed on the first area, attribute information about applications, and the like. Specifically, the setting information about whether to use a screen split function may be certain information which is set by a user to respectively display two or more application execution screens on logically divided screen areas in a multitasking environment. The information about applications to be disposed on the first area may be certain information about an application to be displayed on the first application execution screen when the screen split function is activated. This information may be set by a user. For example, the information about applications to be disposed on the first area may be in the form of a widget, an application, a gadget, and the like, and may be set by a user. The attribute information about applications may be set during development of the application, during manufacture of the electronic device, as one of user defined settings, or the like. This application attribute information may be information indicating a display location of an application execution screen. If the application attribute information is set to display an application execution screen on another area, the electronic device 100 may display a relatively distant application execution screen on a relatively near area (e.g., the second area). If the application attribute information is set to display an item for controlling the third application execution screen, the electronic device 100 may display, on a relatively near area (e.g., the second area), an item for controlling an application execution screen displayed on a relatively distant area (e.g., the first area). The term "relatively distant execution screen" means an application execution screen, i.e., one of screens 130a and 130b, that is not close to the user's fingers for manipulation while the user holds the electronic device 100, while the term "relatively near area" refers to an application execution screen that is close to the user's fingers for manipulation while the user holds the device.

The touch screen 130 may include a touch panel 131 and a display panel 132. The touch panel 131 may detect a touch input or a hover input on the surface of the touch screen 130. The touch panel 131 may create detection information in response to a user input and then deliver the created detection information to the control unit 140.

In an embodiment of the present disclosure, the touch panel 131 may detect a touch input on each of the logically divided first and second areas.

The display panel 132 may be formed of a liquid crystal display (LCD), an active matrix organic light emitted diode (AMOLED), a flexible display, a transparent display, or the like.

The display panel 132 may display application execution screens on the logically divided first and second areas, respectively, under the control of the control unit 140.

Additionally, the display panel 132 may display, on the second area, at least one item for controlling an application displayed on the first area under the control of the control unit 140.

The control unit 140 may control the entire operation of the electronic device 100. The control unit 140 may recognize the activation of a screen split function. When the screen split function is activated, the control unit 140 controls the display panel 132 to display the first application execution screen on the first area and also display the second application execution screen on the second area. In addition, the control unit 140 detects the occurrence of an event for executing the third application. This event may occur in order to execute a new application while respective application execution screens are displayed on the divided screen areas. For example, the third application execution event may be a call reception, a message reception, a notification reception, a music playback, a camera activation, and the like. In an embodiment of the present disclosure, in response to the third application execution event, the control unit 140 may control the display panel 132 to display the second application execution screen on the first area and also display the third application execution screen on the second area.

In another embodiment of the present disclosure, when the third application execution event is received, the control unit 140 may control the display panel 132 to display at least one item for controlling the third application execution screen on the second application execution screen. This control item may be a button for controlling the third application displayed on the first area.

If the execution of the third application is terminated while the third application execution screen and/or the control item of the third application are displayed in response to the third application execution event, the control unit 140 may control the display panel 132 to display a state before the third application execution event is detected. The control unit 140 may control the display panel 132 to display the first application execution screen on the first area and also display the second application execution screen on the second area.

In another embodiment of the present invention, when the execution of the third application is terminated, the control unit 140 may control the display panel 132 to remove the at least one item for controlling the third application from the second area. At this time, the control unit 140 may further control the display panel 132 to remove the third application execution screen from the first area and instead display the first application execution screen on the first area.

Figure 3:
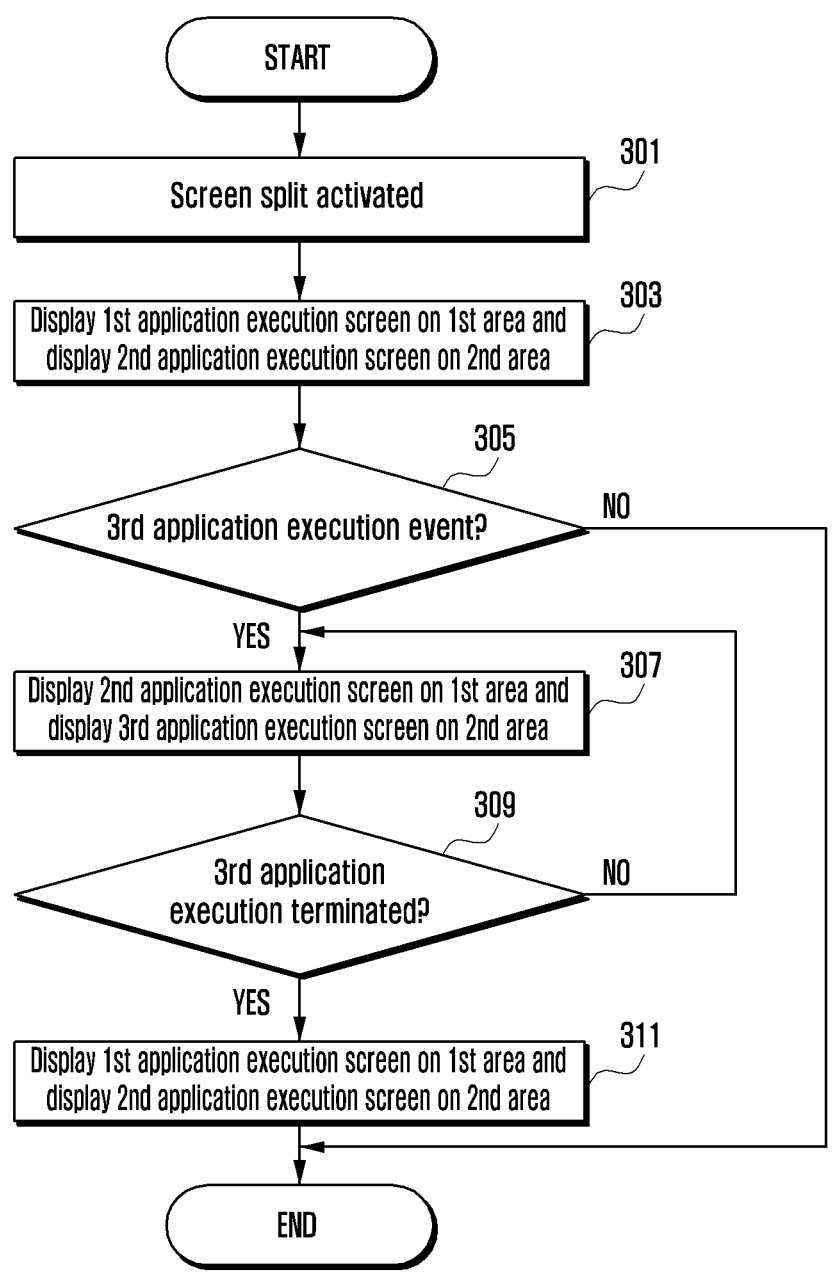
FIG. 3 is a flowchart illustrating a process of controlling a display of application execution screens according to an embodiment of the present disclosure.
Figure 4:
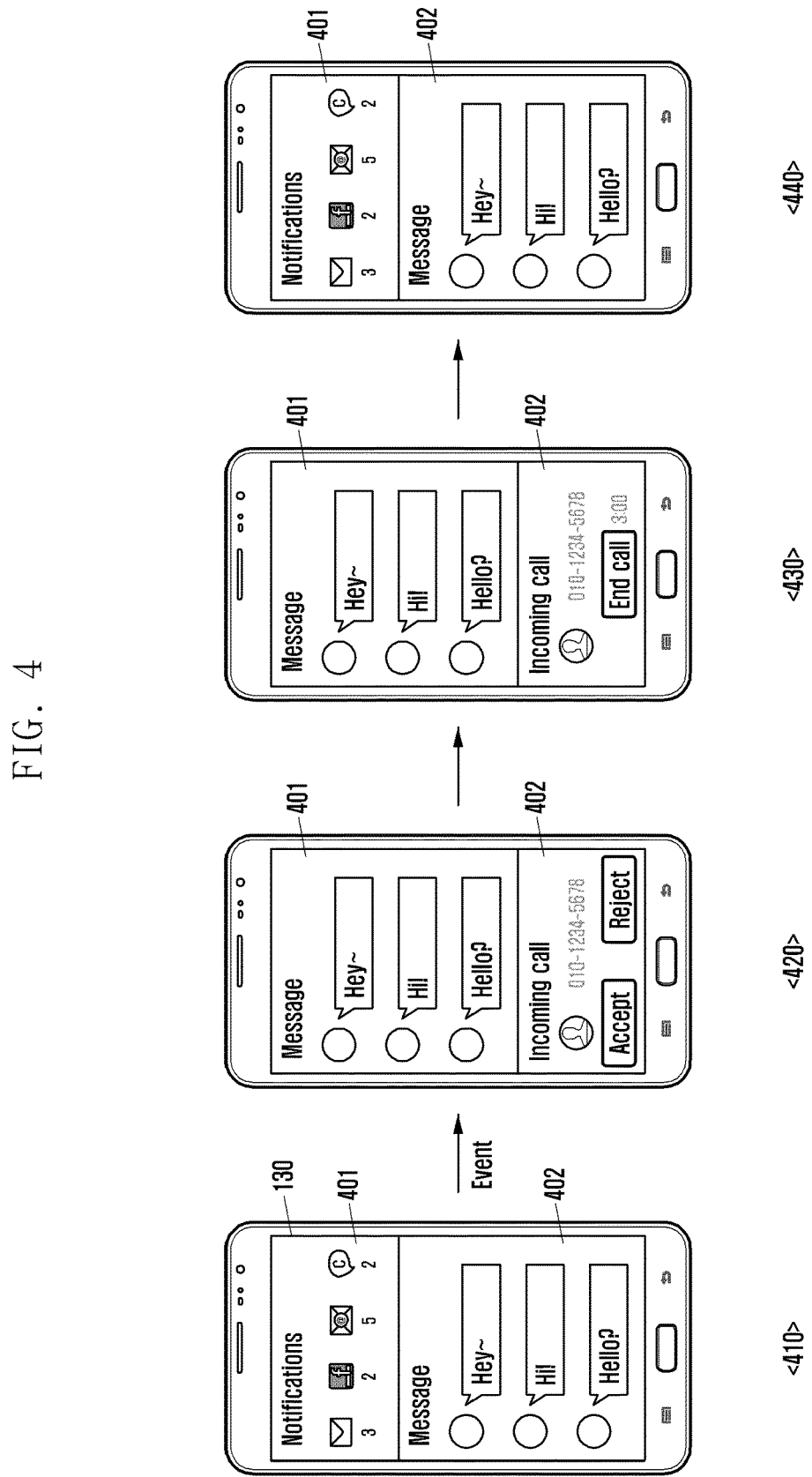
FIG. 4 shows display screenshots illustrating a process of controlling a display of application execution screens according to an embodiment of the present disclosure.

FIG. 3 is a flowchart illustrating a process of controlling a display of application execution screens according to an embodiment of the present disclosure. FIG. 4 shows screenshots illustrating a process of controlling a display of application execution screens according to an embodiment of the present disclosure.

In step 301, the control unit 140 recognizes that a screen split function is activated. The screen split function may be set by a user to display respective application execution screens on logically divided areas of the screen in a multitasking environment.

In step 303, as shown in screenshot 410 of FIG. 4, the control unit 140 controls the display panel 132 to display the first application execution screen on the first area 401 of the touch screen 130 and also display the second application execution screen on the second area 402. The first application execution screen may be executed by a user. An application executed in the first application execution screen may always maintain an executed state, and this function may be set by a user. In the first application execution screen, one of a specific application selected by a user, a predefined default application, a recently executed application, and a frequently executed application may be displayed in the form of a widget, a shortcut, an icon, and the like. A display form may be not limited to these examples.

When a notification application is executed in the first application execution screen as shown in screenshot 410 of FIG. 4, the control unit 140 controls the display panel 132 to display a notification application execution screen in the form of widget. The first application execution screen may be displayed at the same layer as the second application execution screen is displayed.

In step 305, the control unit 140 determines whether an event for executing a third application occurs. This third application execution event may occur in order to execute a new application while respective application execution screens are displayed on the first and second areas 401 and 402. For example, the third application execution event may be a call reception, a message reception, a notification reception, a music playback, a camera activation, and the like.

If the third application execution event does not occur, the control unit 140 controls the display panel 132 to maintain a current screen display. The first and second application execution screens may still be displayed on the first and second areas, 401 and 402, respectively.

If the third application execution event occurs, in step 307 the control unit 140 controls the display panel 132 to display a screen based on the attribute of an application corresponding to the third application execution event.

Specifically, the control unit 140 may control the display panel 132 to display the third application execution screen executed in response to the third application execution event on the first area 401 and also display the second application execution screen on the second area 402. Subsequently, based on the attribute of the third application, the control unit 140 may control the display panel 132 to display the third application execution screen on the second area 402 and also display the second application execution screen on the first area 401, as shown in screenshot 420 of FIG. 4. At this time, the first application execution screen and the third application execution screen may be seen as if having exchanged locations. The attribute of an application executed in response to the third application execution event may be information about a display location of an application execution screen. This attribute may be set during development of the application, during manufacture of the electronic device, as one of user defined settings, and the like.

In an embodiment of the present disclosure, the control unit 140 controls the display panel 132 to display a message application execution screen as the second application execution screen on the first area 401 according to the attribute of the third application executed in response to the third application execution event. Also, the control unit 140 may control the display panel 132 to display a call application execution screen as the third application execution screen on the second area 402. For example, the attribute of a call application as the third application may be set to move an application execution screen.

In step 309, the control unit 140 determines whether the execution of the third application is terminated. For example, the end of a call, the completed reception of a message, the termination of a music playback, the deactivation of a camera, and the like may be considered as the termination of the third application. As shown in screenshot 430 of FIG. 4, the control unit 140 recognizes the termination of the third application when an incoming call is ended.

The control unit 140 may perform step 307 until the execution of the third application is terminated. Namely, if the execution of the third application is not terminated, the control unit 140 may control the display panel 132 to display the third application execution screen on the second area 402 and also display the second application execution screen on the first area 401.

When the execution of the third application is terminated, the control unit 140 controls the display panel 132 to display the first application execution screen on the first area 401 and also display the second application execution screen on the second area 402 in step 311, as shown in screenshot 440 of FIG. 4.

In an embodiment of the present application, when a call application (i.e., the third application) is terminated as shown in screenshot 440 of FIG. 4, the control unit 140 may control the display panel 132 to display a notification widget execution screen on the first area 401 and also display a message application execution screen on the second area 402. The notification widget execution screen displayed on the first area 401 may correspond to the first application executed before the execution of the third application, as in screenshot 410 of FIG. 4.

Figure 5:
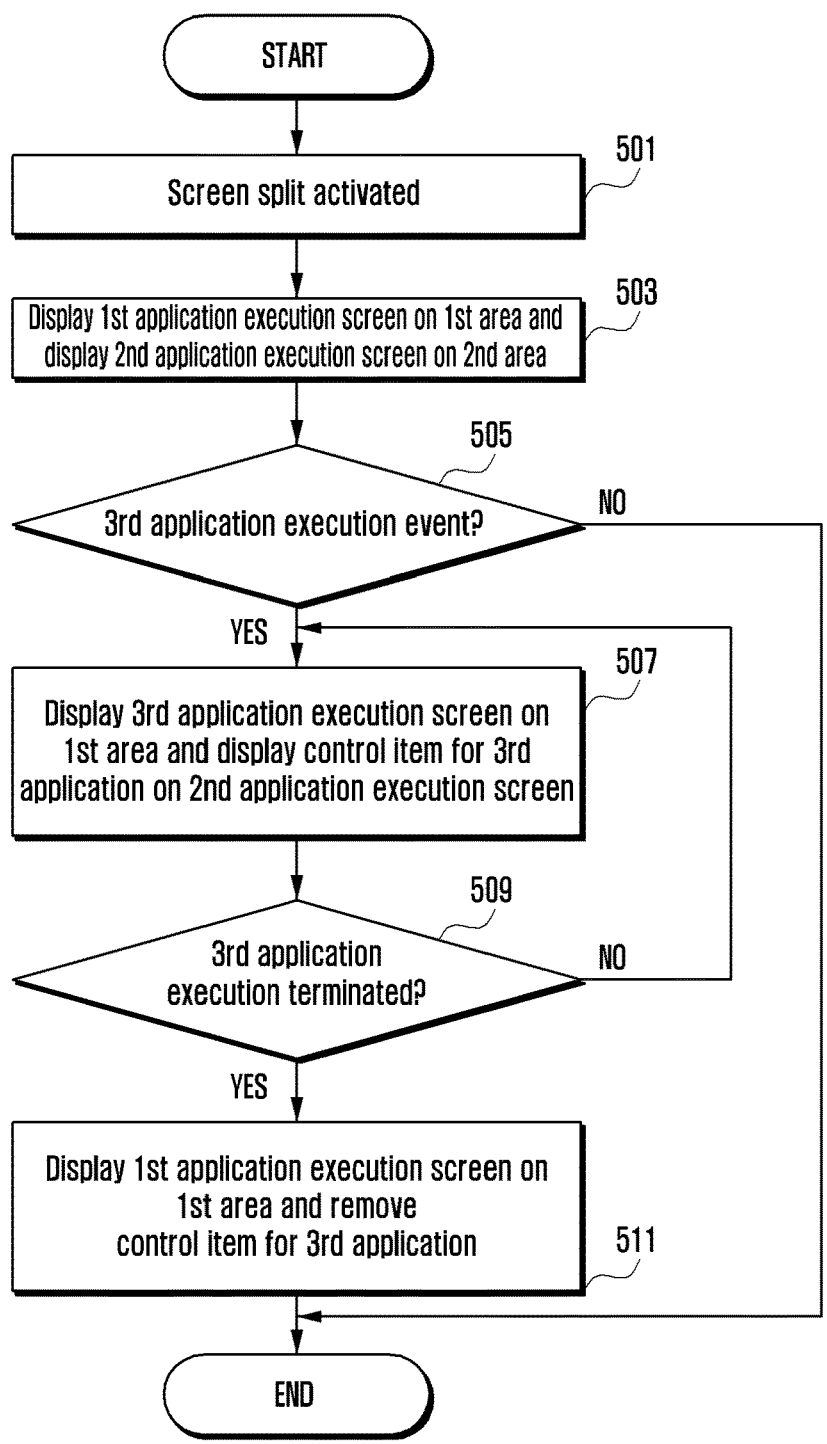
FIG. 5 is a flowchart illustrating a process of controlling a display of application execution screens according to another embodiment of the present disclosure.

FIG. 5 is a flowchart illustrating a process of controlling a display of application execution screens according to another embodiment of the present disclosure. FIGS. 6 to 9 shows screenshots illustrating a process of controlling a display of application execution screens according to embodiments of the present disclosure.

Figure 6:
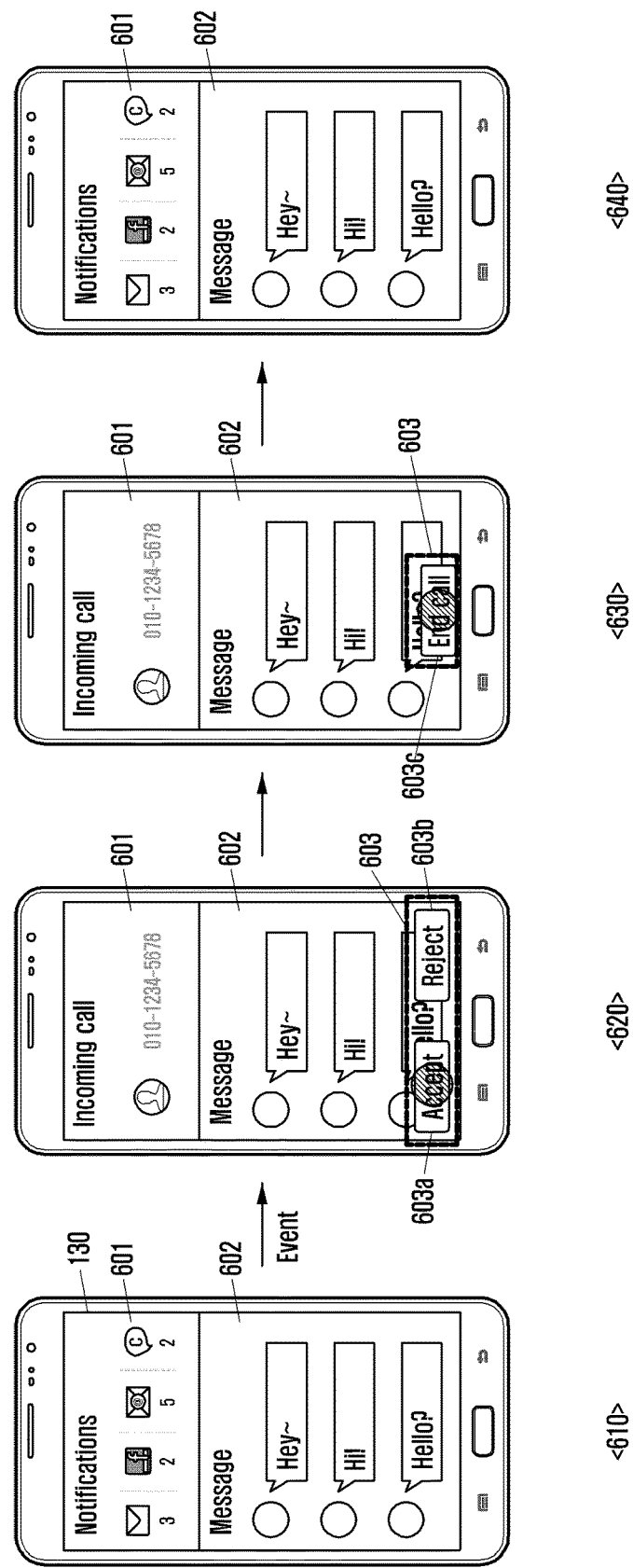
FIGS. 6 to 9 show display screenshots illustrating a process of controlling a display of application execution screens according to embodiments of the present disclosure.

Referring to FIGS. 5 and 6, in step 501, the control unit 140 recognizes that a screen split function is activated. The screen split function may be set by a user to display respective application execution screens on logically divided areas of the screen in a multitasking environment.

When the screen split function is activated, in step 503 the control unit 140 controls the display panel 132 to display the first application execution screen on the first area 601 and also display the second application execution screen on the second area 602 as shown in screenshot 610 of FIG. 6. In the first application execution screen, one of a specific application selected by a user, a predefined default application, a recently executed application, and a frequently executed application may be displayed in the form of a widget, a shortcut, an icon, and the like.

As shown in screenshot 610 of FIG. 6, the control unit 140 controls the display panel 132 to display a notification application execution screen as the first application execution screen in the form of widget on the first area 601. The control unit 140 controls the display panel 132 to display a message application execution screen as the second application execution screen on the second area 602.

In step 505, the control unit 140 determines whether an event for executing the third application occurs. This third application execution event may occur in order to execute a new application while respective application execution screens are displayed on the first and second areas 601 and 602. For example, the third application execution event may be a call reception, a message reception, a notification reception, a music playback, a camera activation, and the like.

If the third application execution event occurs, in step 507 the control unit 140 controls the display panel 132 to display a screen based on the attribute of an application corresponding to the third application execution event.

Specifically, the control unit 140 controls the display panel 132 to display the third application execution screen executed in response to the third application execution event on the first area 601. Then, based on the attribute of the third application, the control unit 140 controls the display panel 132 to display at least one item for controlling the third application execution screen overlapping onto the second area 602. At this time, the attribute of the third application may be set by a user to display at least one item for controlling the third application execution screen on the second area 602. This item may control the third application executed in response to the third application execution event and may be displayed as, e.g., a button, an icon, and the like.

In an embodiment of the present disclosure, if the control unit 140 is set to display an item 603 for controlling the third application execution screen overlapping onto the second area 602, the control unit 140 controls the display panel 132 to display this control item 603 on the second area 602 as shown in screenshot 620 of FIG. 6. For example, the item 603 for controlling the third application execution screen may be a call accept button 603a and a call reject button 603b. Through these control items 603, the control unit 140 may control an application executed in response to the third application execution event. For example, when the call accept button 603a is selected, a call is connected. A user may determine a display location of the control item 603 and whether to use the control item 603. The control item 603 may be displayed at an upper layer in relation to the first and second application execution screens. The control item 603 may also be displayed in the form of a floating button.

In step 509, the control unit 140 determines whether the execution of the third application is terminated. If an end call button 603c is selected as shown in screenshot 630 of FIG. 6, the control unit 140 determines that the execution of the third application is terminated. For example, the end of a call may be recognized as the termination of the third application.

The control unit 140 controls the display panel 132 to display the item 603 for controlling the third application execution screen on the second application execution screen until the execution of the third application is terminated.

Meanwhile, when the execution of the third application is terminated, the control unit 140 controls the display panel 132 to remove the control item 603 from the screen in step 511 as shown in screenshot 640. Further, the control unit 140 may control the display panel 132 to display the first application execution screen on the first area 601 and also display the second application execution screen on the second area 602, as in screenshot 610 of FIG. 6.

Figure 7:
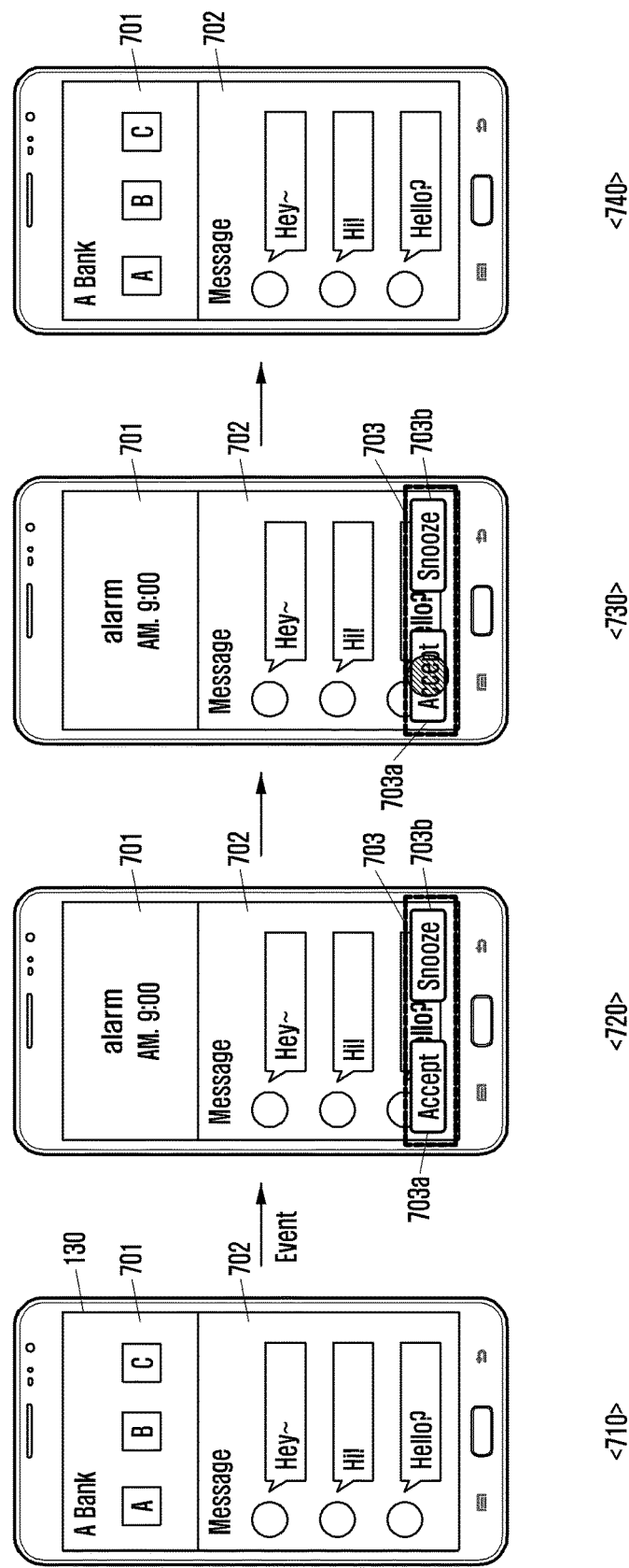
Figure 8:
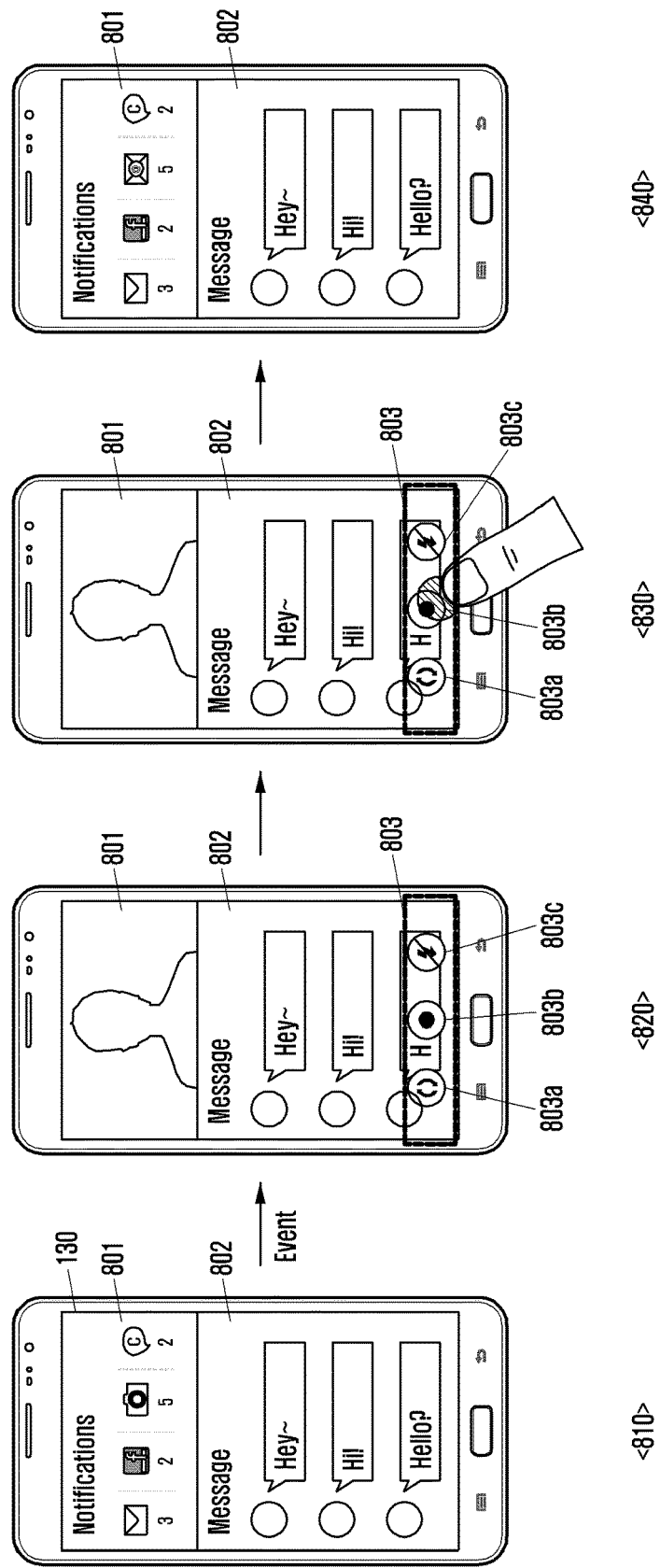
Figure 9:
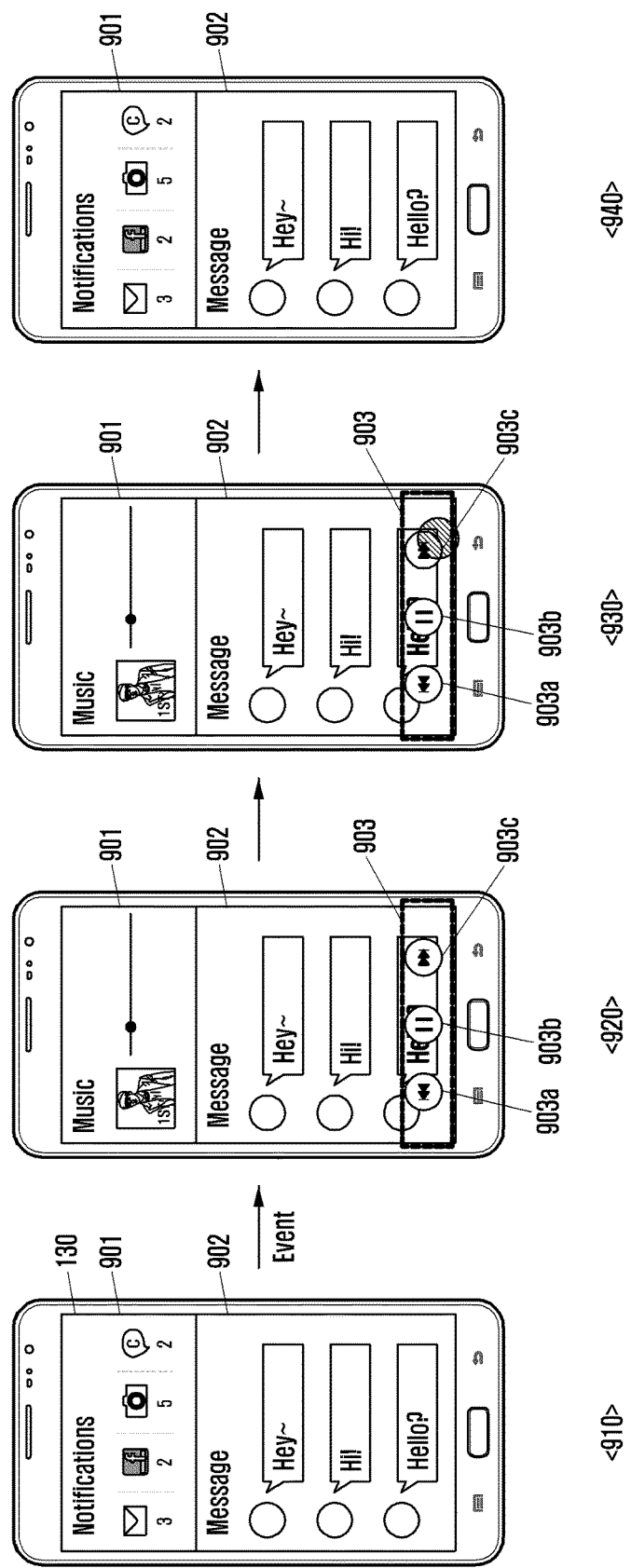

FIGS. 7 to 9 are based on the assumption that the third application has an attribute set to display an item for controlling the third application execution screen.

Referring to FIG. 7, as shown in screenshot 710, the control unit 140 controls the display panel 132 to display the first application execution screen 701 and the second application execution screen 702 on a split screen of the touch screen 130. For example, the first application execution screen 701 may be displayed on an upper part of the touch screen 130, and the second application execution screen 702 may be displayed on a lower part of the touch screen 130. When a screen split function is activated, the control unit 140 may execute respective applications and also control the display panel 132 to display the corresponding application execution screens 701 and 702. For example, as shown, a bank application and a message application may be executed in the first and second application execution screens 701 and 702, respectively, in screenshot 710. Alternatively, any other application such as a game application, a gallery application, and the like may be executed. Different applications executed in the first and second application execution screens 701 and 702 may be executed and controlled separately and independently.

While the first and second application execution screens 701 and 702 are displayed separately, the control unit 140 may receive an event for executing the third application. This event may occur in order to execute a new application while respective application execution screens are displayed on the divided screen areas. For example, the third application execution event may be a call reception, a message reception, a notification reception, a music playback, a camera activation, and the like. In response to the third application execution event, the control unit 140 may control the display panel 132 to display the third application execution screen corresponding to the third application execution event. At this time, the control unit 140 may change one of currently displayed application execution screens to the third application execution screen. For example, the control unit 140 may control the display panel 132 to display the third application execution screen instead of the first application execution screen.

The control unit 140 may determine whether the attribute of the third application is set to display the first and second application execution screens to other areas or to display at least one item for controlling the third application execution screen.

In an embodiment of the present disclosure, the third application may be an alarm application as shown in screenshot 720 of FIG. 7. If the alarm application has an attribute to display an item 703 for controlling an alarm application execution screen on the second area, the control unit 140 controls the display panel 132 to display the control item 703 on the second area 702 as shown in screenshot 720. The control item 703 may be formed of a first button 703a and a second button 703b and may be displayed at an upper layer in relation to the displayed application execution screens, as shown in screenshot 730 of FIG. 7.

The control unit 140 determines whether the execution of the alarm application (i.e., the third application) is terminated. For example, when the control item 703 is selected, the control unit 140 may recognize that the execution of the alarm application is terminated. Subsequently, the control unit 140 controls the display panel 132 to remove the control item 703 from the screen. Further, as shown in screenshot 740, the control unit 140 may control the display panel 132 to remove the alarm application execution screen (i.e., the third application execution screen) from the first area 701 and return to the display of the bank application execution screen (i.e., the first application execution screen) on the first area 701, as in screenshot 710 of FIG. 7.

Referring to FIG. 8, the control unit 140 may divide the touch screen 130 logically and then control the display panel 132 to display the first application execution screen on the first area 801 and also display the second application execution screen on the second area 802.

In an embodiment of the present disclosure, as shown in screenshot 810, the control unit 140 controls the display panel 132 to display a notification application execution screen as the first application execution screen on the first area 801 and also displays a message application execution screen as the second application execution screen on the second area 802.

The control unit 140 may receive an event for executing the third application. For example, the third application may be a camera application. The control unit 140 may identify the attribute of the third application. Then, based on the identified attribute, the control unit 140 determines a display location of the third application execution screen and whether to display an item for controlling the third application execution screen.

As shown in screenshot 820, the control unit 140 controls the display panel 132 to display at least one item 803 for controlling the third application execution screen on the second area 802. For example, this control item 803 may include a reverse button 803a, a shutter button 803b, and a flash button 803c. In addition, the control unit 140 may control the display panel 132 to display the existing message application execution screen on the second area 802 and also display a camera application execution screen corresponding to the third application execution event on the first area 801. For example, the camera application execution screen as the third application execution screen may be a preview image screen.

As shown in screenshot 830, the control unit 140 detects the termination of the execution of the third application. For example, when the shutter button 803b is the control item selected, the control unit 140 recognizes that the execution of the third application is terminated.

In response to a selection of the shutter button 803b, the control unit 140 stores a captured image in the memory unit 120 and also controls the display panel 132 to display the notification application execution screen which was displayed before the execution of the third application, on the first area 801.

As shown in screenshot 840, the control unit 140 controls the display panel 132 to remove the control item 803 from the second area 802 and also display the notification application execution screen on the first area 801, as in screenshot 801 of FIG. 8.

Referring to FIG. 9, when the screen split function is activated, the control unit 140 controls the display panel 132 to display the first application execution screen on the first area 901 and also display the second application execution screen on the second area 902, as shown in screenshot 910.

As shown in screenshot 910, the control unit 140 controls the display panel 132 to display a notification application execution screen on the first area 801 and also display a message application execution screen on the second area 802.

The control unit 140 may detect an event for executing the third application while respective applications are executed in the first and second areas 901 and 902. For example, the third application may be a music application, and the third application execution event may be a press of a button equipped in an earphone of the electronic device 100. In response to this event, the third application execution screen is displayed on the first area 901, as shown in screenshot 920.

The control unit 140 may identify the attribute of the third application. Then, based on the identified attribute, the control unit 140 may determine a display location of the third application execution screen and whether to display an item 903 for controlling the third application execution screen.

As shown in screenshot 920, the control unit 140 controls the display panel 132 to display at least one item 903 for controlling the third application execution screen on the second area 902. For example, this control item 903 may include the first option button 903a, the second option button 903b, and the third option button 903c, which for a music application, may include a reverse button, a playback/pause button, and a forward button, respectively.

In addition, the control unit 140 controls the display panel 132 to display the existing message application execution screen on the second area 902 and also display the music application execution screen corresponding to the third application execution event on the first area 901.

Additionally, as shown in screenshot 930, the control unit 140 determines whether the execution of the third application is terminated. For example, when the third option button 903c is the control item selected, the control unit 140 recognizes that the execution of the third application is terminated.

In response to a selection of the third option button 903c, the control unit 140 may start to play the next music selection and also control the display panel 132 to display the first application execution screen which was displayed before the execution of the third application, on the first area 901.

Further, as shown in screenshot 940, the control unit 140 controls the display panel 132 to remove the control item 903 displayed in an overlapping form on the second area 902 and also displays the notification application execution screen on the first area 901, as in screenshot 910.

According to the embodiments discussed above, the electronic device 100 may change application execution screens displayed on divided screen areas and/or display a control item for an application displayed on the upper screen area on the lower screen area, depending on the attribute of the third application executed in response to a corresponding event. This is merely an example, and is not to be considered as a limitation.

Figure 10:
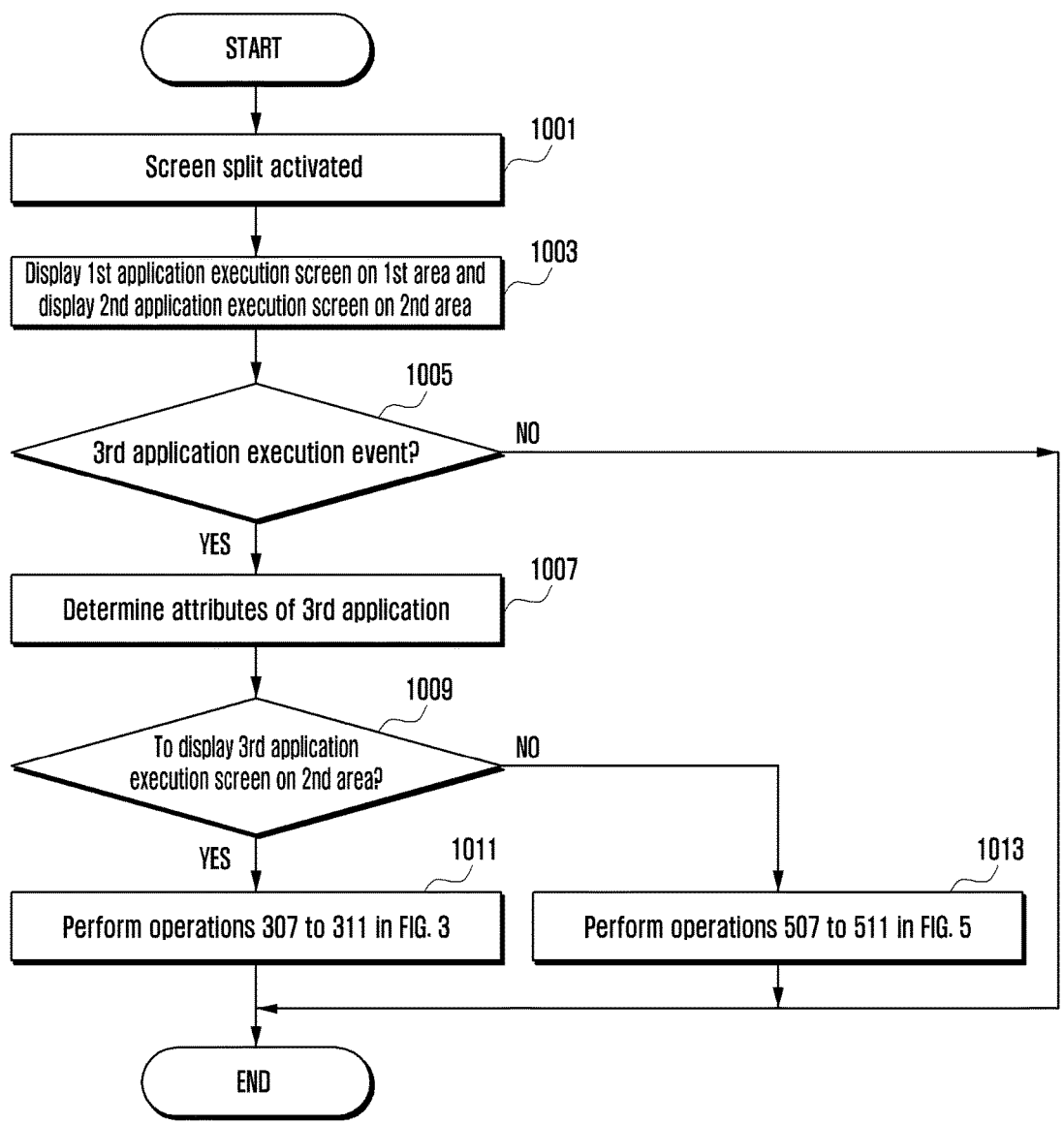
FIG. 10 is a flowchart illustrating a process of controlling a display of application execution screens according to another embodiment of the present disclosure.

FIG. 10 is a flowchart illustrating a process of controlling a display of application execution screens according to another embodiment of the present disclosure.

Referring to FIG. 10, in step 1001, the control unit 140 recognizes that the screen split function is activated. The screen split function may be set by a user to display respective application execution screens on logically divided areas of the screen in a multitasking environment.

In step 1003, the control unit 140 controls the display panel 132 to display the first application execution screen on the first area and also display the second application execution screen on the second area.

In step 1005, the control unit 140 determines whether an event occurs for executing the third application to be newly displayed on the first area. For example, this event may be the arrival of an incoming call.

If the event for executing the third application occurs in step 1005, the control unit 140 determines the attribute of the third application executed in response to the event, in step 1007. The attribute of the third application may be set by a user so as to determine whether to move an application execution screen or to display a control item for an application, or both. Additionally or alternatively, the attribute of the third application may be set during development of the application, during manufacture of the electronic device, and the like.

In step 1009, the control unit 140 determines whether the attribute of the third application is set to display the third application execution screen on any other area (e.g., the second area).

If the attribute of the third application is set to display the third application execution screen on any other area in step 1009, the control unit 140 performs, in step 1011, the steps 307 to 311 discussed above and as shown in FIG. 3. The control unit 140 may control the display panel 132 to display the third application execution screen, prearranged to be displayed on the first area, on the second area. Herein, the repetition of the same as described with reference to FIG. 3 will be avoided.

If the attribute of the third application is set to display at least one control item for the third application execution screen in step 1009, rather than displaying the third application execution screen itself, the control unit 140 performs, in step 1013, the steps 507 to 511 discussed above and as shown in FIG. 5. The control unit 140 may control the display panel 132 to display the at least one control item for the third application execution screen displayed on the first area, on the second area. Herein, the repetition of the same as described with reference to FIG. 5 will be avoided.

When different application execution screens are displayed on a split screen in a multitasking environment, an execution screen of a newly executed application may replace one of currently displayed screens and further move toward a user manipulable location. The split screen may have logically or physically divided screen areas. In some cases, only a control item for a newly executed application may be displayed at a user manipulable location. Such display schemes may allow a user to conduct easy and convenient one-handed manipulation.

Additionally, since only an application execution screen of a newly executed application or a control item is moved with other applications still being executed, a user can continue to conveniently use the existing applications.

While the present invention disclosure has been particularly shown and described with reference to certain embodiments thereof, it will be understood by those skilled in the art that various changes in form and details may be made therein without departing from the spirit and scope of the invention. Therefore, the scope of the present disclosure should not be defined as being limited to these embodiments, but should be defined by the appended claims and equivalents thereof.

What is claimed is:

1. An electronic device comprising:
  a display panel configured to display respective application execution screens on a first area and a second area of a display screen, the first and second areas being distinct from each other; and
  a control circuit configured to:
  display a second application execution screen on the first area and to display a third application execution screen on the second area when an event for executing a third application is detected while a first application execution screen is displayed on the first area and the second application execution screen is displayed on the second area,
  display the first application execution screen on the first area and to display the second application execution screen on the second area when execution of the third application is terminated,
  determine an attribute of the third application when the third application is executed in response to the event,
  display the second application execution screen on the first area and to display the third application execution screen on the second area when the attribute of the third application is set to display the third application execution screen on the second area, and
  transparently display a portion of at least one item for controlling the third application execution screen overlapping onto the second application execution screen displayed in the second area when the attribute of the third application is set to display the at least one item on the second area, wherein the portion of the at least one item for controlling the third application execution screen is transparently displayed overlapping onto the second application execution screen while the third application execution screen is simultaneously being displayed in the first area in place of the first application execution screen.

2. The electronic device of claim 1, wherein the first area is located at an upper part of the screen, and the second area is located at a lower part of the screen.

3. The electronic device of claim 1, wherein the control circuit is further configured to display the third application execution screen on the first area when the attribute of the third application is set to display the at least one item for controlling the third application execution screen on the second area.

4. The electronic device of claim 3, wherein the control circuit is further configured to remove the at least one item from the second area and display the first application execution screen on the first area when the execution of the third application is terminated.

5. The electronic device of claim 1, wherein the control circuit is further configured to display one of a specific application selected by a user, a predefined default application, a recently executed application, and a frequently executed application in the form of at least one of a widget, a shortcut, and an icon on the first application execution screen.

6. The electronic device of claim 1, wherein the attribute of the third application is one of information which is set to display the third application execution screen on the second area, and information which is set to display the at least one item for controlling the third application execution screen on the second area, and
wherein the control circuit is further configured to set the attribute of the third application in response to a user input.

7. The electronic device of claim 1, wherein the first and second areas are divided logically or physically within the screen.

8. The electronic device of claim 1, wherein the event for executing the third application is one of a call reception, a music playback, a camera activation, a notification reception, and a message reception.

9. A method for controlling a screen display in an electronic device, the method comprising:
displaying first and second application execution screens on first and second areas of a screen, respectively, wherein the first and second areas are distinct from each other;
detecting an event for executing a third application;
displaying the second application execution screen on the first area and displaying a third application execution screen on the second area in response to the detected event;
displaying the first application execution screen on the first area and displaying the second application execution screen on the second area when execution of the third application is terminated;
determining an attribute of the third application when the third application is executed in response to the event;
displaying the second application execution screen on the first area and displaying the third application execution screen on the second area when the attribute of the third application is set to display the third application execution screen on the second area; and
transparently displaying a portion of at least one item for controlling the third application execution screen overlapping onto the second application execution screen displayed in the second area when the attribute of the third application is set to display the at least one item on the second area,
wherein the portion of the at least one item for controlling the third application execution screen is transparently displayed overlapping onto the second application execution screen while the third application execution screen is simultaneously being displayed in the first area in place of the first application execution screen.

10. The method of claim 9, wherein the first area is located at an upper part of the screen, and the second area is located at a lower part of the screen.

11. The method of claim 9, further comprising:
displaying the third application execution screen on the first area when the attribute of the third application is set to display the at least one item on the second area.

12. The method of claim 11, further comprising:
removing the at least one item from the second area and displaying the first application execution screen on the first area when the execution of the third application is terminated.

13. The method of claim 9, wherein displaying the first application execution screen on the first area includes displaying one of a specific application selected by a user, a predefined default application, a recently executed application, and a frequently executed application in the form of at least one of a widget, a shortcut, and an icon on the first application execution screen.

14. The method of claim 9, wherein the first and second application execution screens are displayed at the same layer of the screen.

15. The method of claim 9, wherein the attribute of the third application is one of information which is set to display the third application execution screen on the second area, and information which is set to display the at least one item for controlling the third application execution screen on the second area, and
wherein the attribute of the third application is set in response to a user input.

16. The method of claim 9, wherein the event for executing the third application is one of a call reception, a music playback, a camera activation, a notification reception, and a message reception.

* * * * *